(12) United States Patent
Pearce et al.

(10) Patent No.: US 8,420,964 B2
(45) Date of Patent: Apr. 16, 2013

(54) ELECTRICAL APPARATUS, AND RACKING ASSEMBLY AND COUPLING THEREFOR

(75) Inventors: Michael Davis Pearce, Plum Branch, SC (US); Jon Christopher Beaver, Greenwood, SC (US)

(73) Assignee: Eaton Corporation, Cleveland, OH (US)

( * ) Notice: Subject to any disclaimer, the term of this patent is extended or adjusted under 35 U.S.C. 154(b) by 331 days.

(21) Appl. No.: 12/902,270

(22) Filed: Oct. 12, 2010

(65) Prior Publication Data
US 2012/0085628 A1    Apr. 12, 2012

(51) Int. Cl.
*H01H 9/20* (2006.01)

(52) U.S. Cl.
USPC ...................... 200/50.25; 361/609

(58) Field of Classification Search .............. 200/50.21, 200/50.24, 50.25; 361/609, 608, 605, 601, 361/600, 724–727
See application file for complete search history.

(56) References Cited

U.S. PATENT DOCUMENTS

| 4,768,967 | A | 9/1988 | Fritsch |
| 4,789,344 | A | 12/1988 | Fritsch et al. |
| 5,486,663 | A | 1/1996 | Fritsch et al. |
| 6,490,149 | B2 * | 12/2002 | Shichida et al. ............. 361/605 |
| 6,951,990 | B1 * | 10/2005 | Miller ........................ 200/50.21 |
| 7,019,230 | B1 | 3/2006 | Vaill et al. |
| 7,582,837 | B2 * | 9/2009 | Lyu et al. ................... 200/50.21 |
| 7,684,199 | B2 | 3/2010 | Yee et al. |
| 7,688,572 | B2 | 3/2010 | Yee et al. |
| 2008/0022673 | A1 | 1/2008 | Morris et al. |
| 2008/0258667 | A1 | 10/2008 | Morris et al. |
| 2012/0193193 | A1 * | 8/2012 | Niedzwiecki ............. 200/50.24 |

* cited by examiner

*Primary Examiner* — Felix O Figueroa
(74) *Attorney, Agent, or Firm* — Eckert Seamans Cherin & Mellott, LLC; Grant E. Coffield

(57) ABSTRACT

A coupling is for a racking assembly for racking an electrical apparatus into and out of an enclosure with an actuator. The electrical apparatus includes a housing. The racking assembly includes a safety interlock, which is movable between a locked position, and an unlocked position corresponding to the racking assembly being operable to rack the electrical apparatus into or out of the enclosure. The coupling includes an adapter having a first portion coupled to the racking assembly, and a second portion coupled to the actuator. A sleeve is movably disposed on the adapter. The sleeve moves the safety interlock from the locked position to the unlocked position. When the safety interlock is disposed in the unlocked position, the adapter transfers movement of the actuator to the racking assembly to move the electrical apparatus.

17 Claims, 4 Drawing Sheets

ELECTRICAL APPARATUS, AND RACKING ASSEMBLY AND COUPLING THEREFOR

BACKGROUND

1. Field

The disclosed concept relates generally to electrical apparatus and, more particularly, to electrical apparatus, such as electrical switching apparatus. The disclosed concept also relates to racking assemblies for electrical switching apparatus. The disclosed concept further relates to couplings for racking assemblies.

2. Background Information

Electrical apparatus used in power distribution systems are often mounted within an enclosure either individually or in combination with other electrical apparatus (e.g., without limitation, circuit switching devices and circuit interrupters such as circuit breakers, contactors, motor starters, motor controllers and other load controllers; potential transformers; control power transformers; fuses).

Some electrical switching apparatus such as, for example, some medium-voltage and low-voltage circuit breakers, can be relatively large. In order to facilitate movement (e.g., installation; removal; maintenance), some circuit breakers are commonly coupled to draw-out mechanisms which permit such circuit breakers to be drawn out of the switchgear enclosure. Accordingly, such circuit breakers are commonly known in the art as "draw-out" circuit breakers. The circuit breaker may be further supported within a draw-out frame, commonly known in the art as a cassette or chassis. The switchgear enclosure generally includes a number of cells, with each cell being structured to receive a corresponding circuit breaker. The draw-out mechanism includes, for example, a combination of rails and rollers coupled to one or the other, or both, of the sidewalls of the cell and the sides of the corresponding circuit breaker and/or cassette, which is to be drawn into and out of the cell. A racking assembly (sometimes referred to as a "lev-in" device), which among other components includes a drive screw and drive rack, facilitates levering the circuit breaker into the cassette. Draw-out circuit breakers are described in further detail, for example, in commonly assigned U.S. Pat. No. 7,019,229, which is hereby incorporated herein by reference.

To enhance safety, it is desirable to avoid manual manipulation of the circuit breaker from close proximity and instead enable remote operation of the lev-in device from a distal location. However, some known medium voltage circuit breakers, for example, have a safety feature incorporating an interlock slide bracket or slider that must be moved (e.g., without limitation, moved inward) to trip the circuit breaker before it can be racked in or out. This operation is typically manually performed by an operator, and typically must be performed through an opening in the door which can expose the operator to hazards.

There is, therefore, room for improvement in electrical switching apparatus, such as circuit breakers, and in racking assemblies and couplings therefor.

SUMMARY

These needs and others are met by embodiments of the disclosed concept, which are directed to a coupling for racking assemblies for electrical switching apparatus, such as circuit breakers. Among other benefits, the coupling enhances safety by enabling the racking assembly to be operated remotely to rack the circuit breaker in and out and by enabling the racking assembly to be operated with the door completely closed and free of openings.

As one aspect of the disclosed concept, a coupling is provided for a racking assembly for racking an electrical apparatus into and out of an enclosure with an actuator. The electrical apparatus includes a housing. The racking assembly comprises a safety interlock, which is movable between a locked position corresponding to the racking assembly not being operable to move the electrical apparatus with respect to the enclosure, and an unlocked position corresponding to the racking assembly being operable to rack the electrical apparatus into or out of the enclosure. The coupling comprises: an adapter comprising a first portion structured to be coupled to the racking assembly, and a second portion structured to be coupled to the actuator; and a sleeve movably disposed on the adapter, the sleeve being structured to move the safety interlock from the locked position to the unlocked position. When the safety interlock is disposed in the unlocked position, the adapter is structured to transfer movement of the actuator to the racking assembly to move the electrical apparatus with respect to the enclosure.

The racking assembly may further comprise a drive shaft, wherein the first portion of the adapter is structured to be coupled to the drive shaft. The second portion of the adapter may be movable with and independently with respect to the first portion. When the second portion moves independently with respect to the first portion, the adapter may be structured not to move the drive shaft and, when the second portion moves with the first portion, the adapter may be structured to move the drive shaft, thereby moving the electrical apparatus. The adapter may further comprise a bearing member disposed between the first portion of the adapter and the second portion of the adapter.

A racking assembly and an electrical apparatus employing the aforementioned coupling, are also disclosed.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
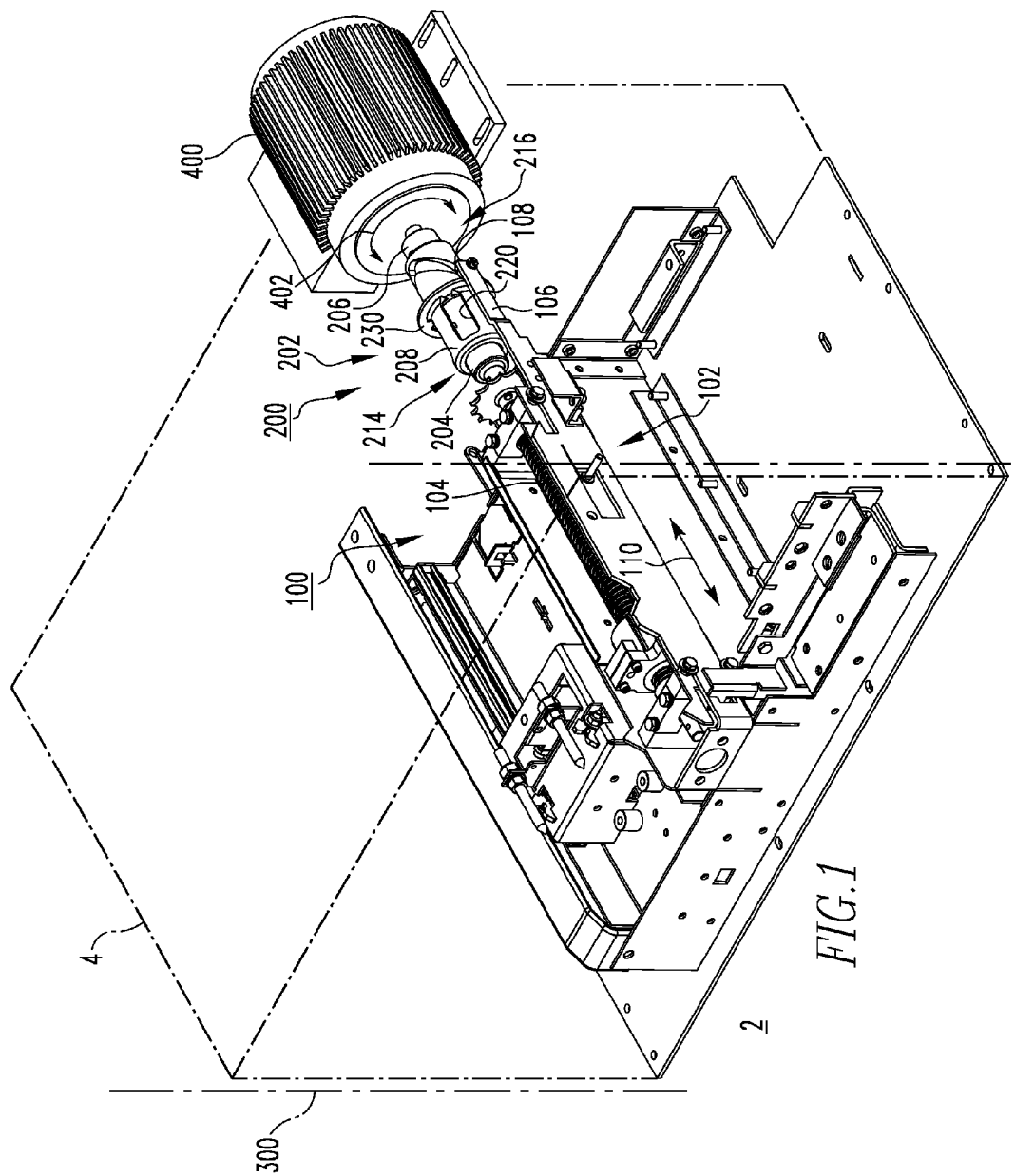
FIG. 1 is an isometric simplified view of a portion of a circuit breaker, and racking assembly and coupling therefor, in accordance with an embodiment of the disclosed concept.

Directional phrases used herein, such as, for example, left, right, clockwise, counterclockwise, forward, backward and derivatives thereof, relate to the orientation of the elements shown in the drawings and are not limiting upon the claims unless expressly recited therein.

As employed herein, the term "fastener" refers to any suitable connecting or tightening mechanism expressly including, but not limited to, screws, bolts and the combinations of bolts and nuts (e.g., without limitation, lock nuts) and bolts, washers and nuts.

As employed herein, the statement that two or more parts are "coupled" together shall mean that the parts are joined together either directly or joined through one or more intermediate parts.

As employed herein, the term "number" shall mean one or an integer greater than one (i.e., a plurality).

FIG. 1 shows a coupling 200 for a racking assembly 100, which is structured to rack an electrical apparatus such as, for example and without limitation, a circuit breaker 2 (partially shown in simplified form in FIG. 1) into and out of an enclosure 300 (e.g., without limitation, a switchgear cabinet) (partially shown in phantom line drawing in FIG. 1). The circuit breaker 2 includes a housing 4, which is shown in phantom line drawing in FIG. 1. An actuator, which in the non-limiting example shown and described herein is an electric motor 400, is structured to actuate (e.g., move) the racking assembly 100.

More specifically, the racking assembly 100 includes a safety interlock 102, which is movable (e.g., forward and backward in the direction of arrow 110 from the perspective of FIG. 1) between a locked position, corresponding to the racking assembly 100 not being operable to move the circuit breaker 2 with respect to the enclosure 300, and an unlocked position (shown), corresponding to the racking assembly 100 being operable to rack the circuit breaker 2 into (shown) or out of the enclosure 300. The racking assembly 100 further includes a drive shaft 104. The disclosed coupling 200 is structured to couple the draft shaft 104 to the actuator 400 (e.g., without limitation, electric motor), as will now be described in greater detail.

Continuing to refer to FIG. 1, and also to FIGS. 2-6, it will be appreciated that the coupling 200 preferably includes an adaptor 202. The adaptor 202 includes a first portion 204 coupled to the racking assembly 100 and, in particular, to the drive shaft 104 thereof, and a second portion 206 coupled to the electric motor 400, as shown in FIG. 1. A sleeve 208 is movably disposed on the adaptor 202, and is structured to move (e.g., forward and backward in the direction of arrow 110 from the perspective of FIG. 1) the safety interlock 102 from the locked position to the unlocked position of FIG. 1. When the safety interlock 102 is disposed in the unlocked position, the adaptor 202 transfers movement of the electric motor 400 to the drive shaft 104 of the racking assembly 100 to move the circuit breaker 2 with respect to the enclosure 300.

It will be appreciated that the first portion 204 of the adaptor 202 is movable both with, and independently with respect to, the first portion 204 of the adaptor 202. Thus, when the second portion 206 moves independently with respect to the first portion 204, the adaptor 202 does not move the drive shaft 104. However, when the second portion 206 does move with the first portion 204, the adaptor 202 moves the drive shaft 104, thereby moving the circuit breaker 2. To facilitate movement between the first and second portions 204,206 of the adaptor 202, the adaptor 202 preferably includes a bearing member 210 (FIGS. 2-6). As best shown in the side elevation section view of FIG. 6, the bearing member preferably comprises a thrust bearing 210, which is disposed between the first portion 204 and a second portion 206 of the adaptor 202.

Accordingly, it will be appreciated that the disclosed coupling 200 is structured to not only transfer movement (e.g., pivoting clockwise or counterclockwise in the direction of arrow 402 from the perspective of FIG. 1) of the electric motor 400 or other suitable actuator (not shown), but also to move the aforementioned safety interlock 102 of the racking assembly 100 to the unlocked position, so the actuator 400 can be utilized to rack the circuit breaker 2 into or out of the enclosure 300. It will further be appreciated that the disclosed racking assembly 100 and coupling 200 therefor enable such movement to be initiated and performed from within the circuit breaker housing 4, automatically, such that the racking operation can be safely performed, for example, from a remote location distal from the enclosure 300 to enhance safety for operating personnel.

Figure 5:
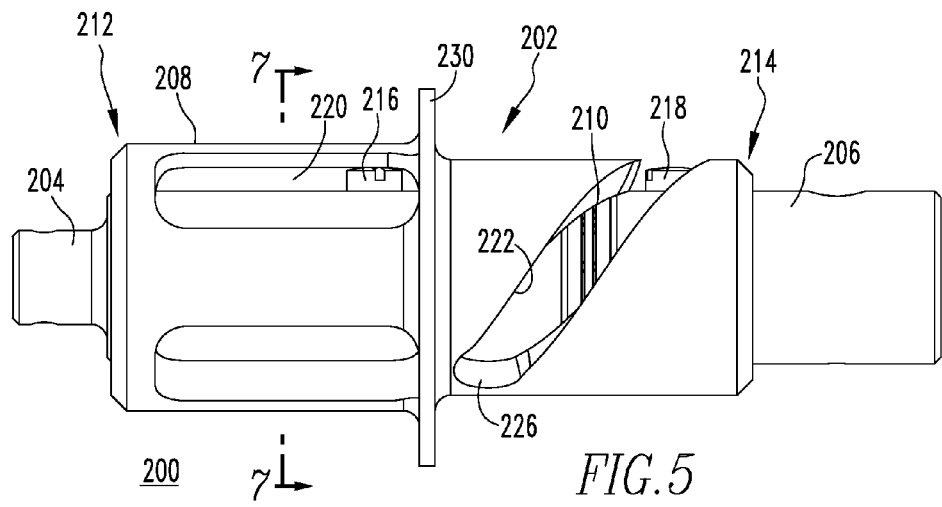
FIG. 5 is a side elevation view of the coupling of FIG. 4.
Figure 6:
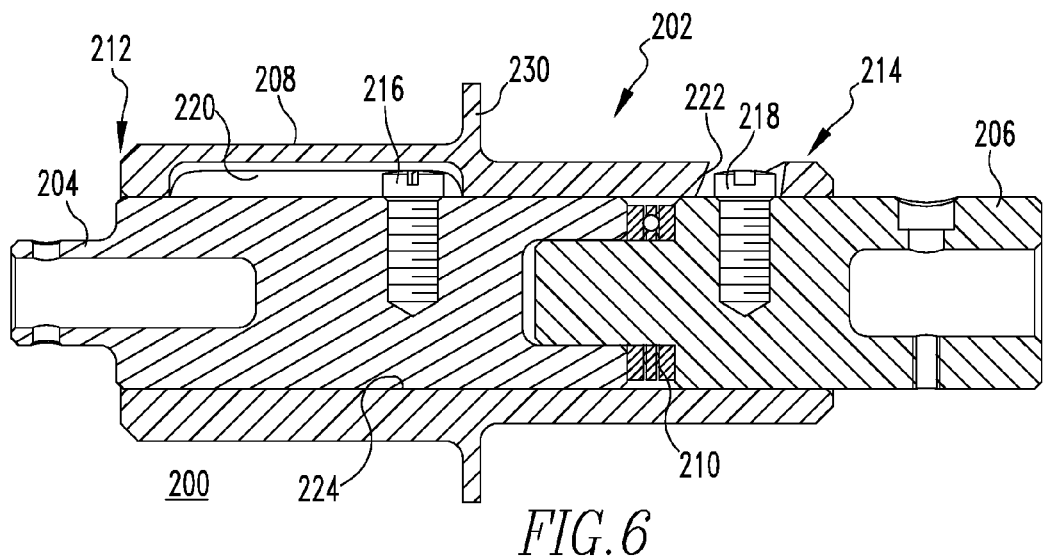
FIG. 6 is a section view taken along line 6-6 of FIG. 4.

As shown in FIGS. 2-6, the sleeve 208 of the coupling 200 includes first and second opposing segments 212,214. The first segment 212 includes a first passageway 220, and the second segment 214 includes a second passageway 222. As best shown in FIGS. 5 and 6, the adaptor 202 further includes a first protrusion, which in the example shown and described here is a first fastener or drive pin 216 that extends outwardly from the first portion 204 and is movably disposed in the first passageway 220.

A second protrusion, which in the example shown and described herein is a second fastener or drive pin 218, extends outwardly from the second portion 206 of the adaptor 202 and is movably disposed in the second passageway 222 of the sleeve 208.

Figure 7:
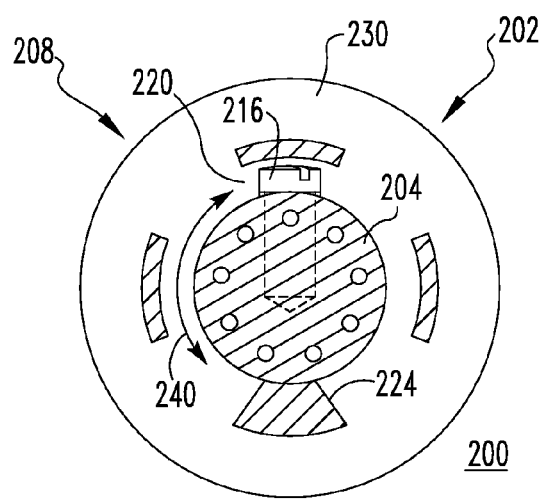
FIG. 7 is a section view taken along line 7-7 of FIG. 5.

As shown in FIGS. 6 and 7, the first segment 212 of the example sleeve 208 includes a drive rib 224, which is disposed in the first passageway 220. It will be appreciated, therefore, that the first fastener or drive pin 216 cooperates with the drive rib 224. That is, when the first portion 204 of the adaptor 202 moves (e.g., pivots clockwise or counterclockwise in the direction of arrow 240 from the perspective of FIG. 7), the first drive pin 216 will eventually engage one of the sides of the drive rib 224. The second passageway 222 (FIGS. 1-6) of the sleeve 208 includes first and second ends 226,228 (both shown in FIG. 4). The second fastener or drive pin 218 is structured to cooperate with a corresponding one of the ends 226,228 when the second portion 206 of the adaptor 202 moves.

Figure 2:
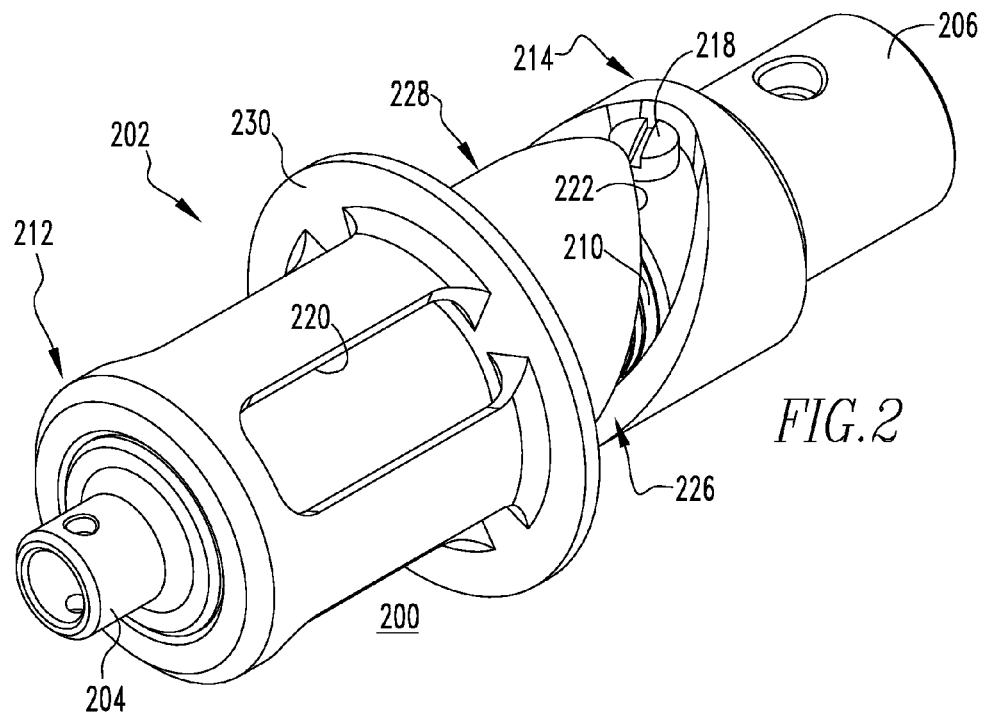
FIG. 2 is a front isometric view of the coupling of FIG. 1.
Figure 3:
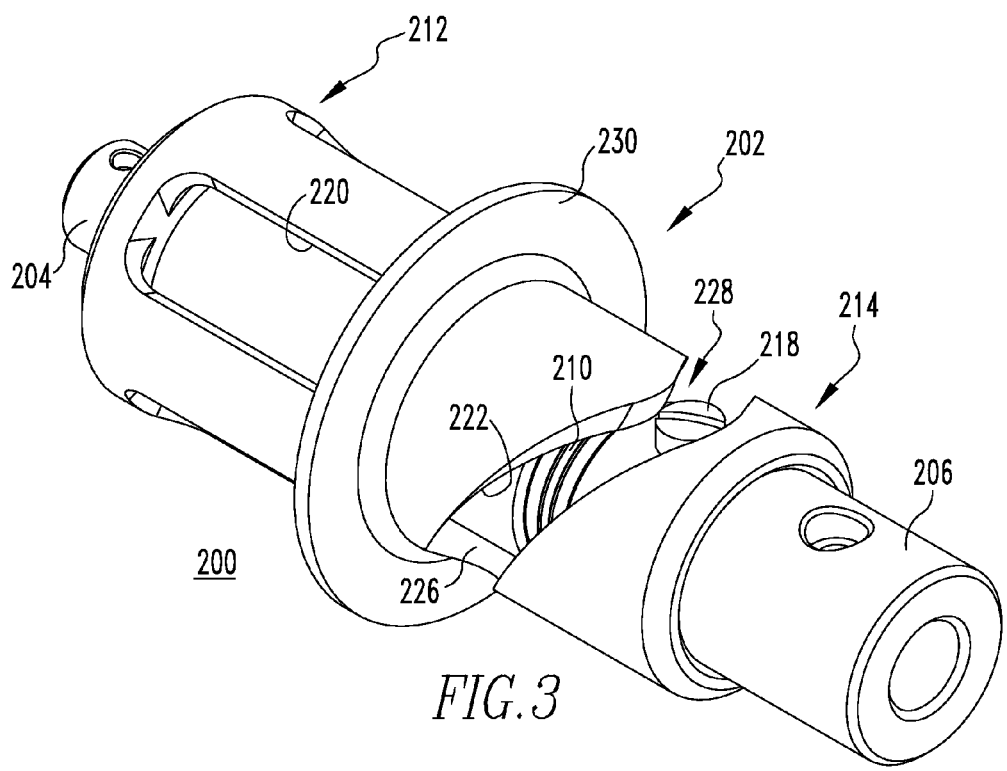
FIG. 3 is a back isometric view of the coupling of FIG. 2.
Figure 4:
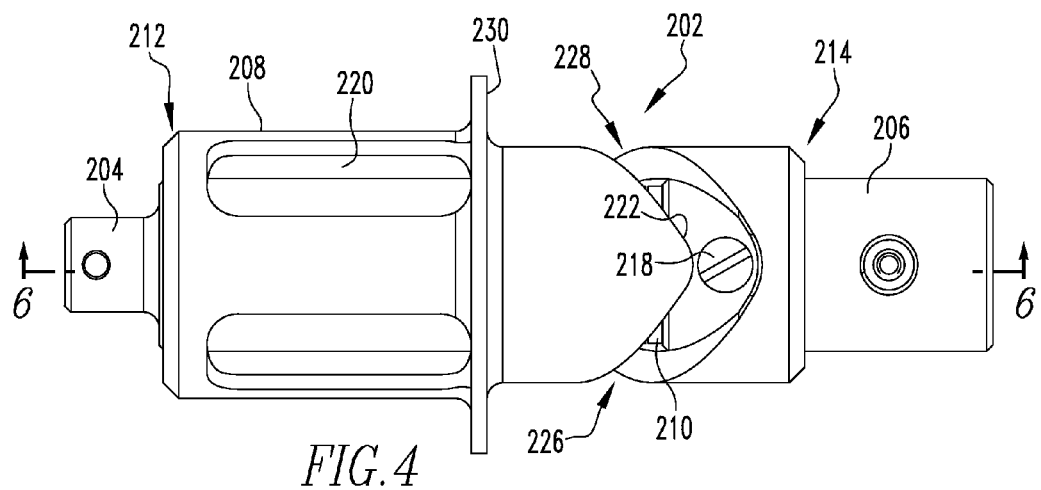
FIG. 4 is a top plan view of the coupling of FIG. 3.

Operation of the disclosed coupling 200 will now be described in greater detail. Specifically, the sleeve 208 preferably further includes a collar 230, which extends radially outwardly from the sleeve 208 between the first segment 212 and the second segment 214. The exemplary second passageway 222 extends away from the collar 230 at an angle, as best shown in FIGS. 2, 3 and 5. Accordingly, in operation, when the actuator 400 (FIG. 1) (e.g., without limitation, electric motor) is actuated, the second portion 206 of the adaptor 202 pivots (e.g., clockwise or counterclockwise in the direction of arrow 402 from the perspective of FIG. 1), thereby moving the second drive pin 218 within the second passageway 202 and, in turn, moving (e.g., to the right from the perspective of FIG. 5) the sleeve 208 with respect to the adaptor 202 (see also the position of sleeve 208 in FIG. 1). As it does so, the collar 230 moves the safety interlock 102 toward the unlocked position of FIG. 1. More specifically, the safety interlock 102 preferably includes a slide bracket or slider 106 and a projection 108 (e.g., without limitation, fastener), which extends inwardly from the slider 106 to cooperate with the sleeve collar 230, as shown in FIG. 1.

Accordingly, as the sleeve 208 and, in particular, the collar 230 thereof, move toward the actuator 400, the collar 230 engages the projection 108 of the slider 106 and correspondingly moves (e.g., backward in the direction of arrow 110 from the perspective of FIG. 1) the safety interlock 102 to the unlocked position. The safety interlock 102 and slider 106 thereof are preferably biased toward the locked position such that when the actuator 400 is not actuated, the safety interlock 102 is structured to automatically return to the locked position, in order to resist undesired operation (e.g., racking movement) of the circuit breaker 2 with respect to the enclosure 300.

Once the coupling 200 has effectively moved the safety interlock 102 to the unlocked position, the second drive pin 218 will eventually engage a corresponding one of the first and second ends 226,228 of the second passageway 222 of the sleeve 208. At that point, the second portion 206 of the adaptor 202 will pivot with the first portion 204, rather than pivoting independently with respect thereto. Additionally, the collar 230 maintains the safety interlock 102 in the unlocked position and, in response to the first portion 204 of the adaptor 202 being pivoted, the first drive pin 216 will eventually engage and move the drive rib 224 (FIGS. 6 and 7), as previously described. When it does so, the first drive pin 216 will drive the drive rib 224, resulting in the adaptor 202 transferring movement from the actuator 400, via movement of the entire adaptor 202, to move the drive shaft 104 and perform the desired racking operation of the circuit breaker 2 with respect to the enclosure 300.

Accordingly, the disclosed coupling 200 provides an effective mechanism for simultaneously unlocking the safety interlock 102 of the circuit breaker racking assembly 100 and actuating the racking assembly 100 to perform a desired racking operation (e.g., without limitation, racking in; racking out) with respect to the enclosure 300 (FIG. 1). The coupling 200 also enables movement of the racking assembly 100 to be initiated by the actuator 400 from within the circuit breaker housing 4, thereby enhancing safety associated with operation of the system.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A coupling for a racking assembly for racking an electrical apparatus into and out of an enclosure with an actuator, said electrical apparatus including a housing, said racking assembly comprising a safety interlock, said safety interlock being movable between a locked position corresponding to said racking assembly not being operable to move said electrical apparatus with respect to said enclosure, and an unlocked position corresponding to said racking assembly being operable to rack said electrical apparatus into or out of said enclosure, said coupling comprising:
   an adapter comprising a first portion structured to be coupled to said racking assembly, and a second portion structured to be coupled to said actuator: and
   a sleeve movably disposed on said adapter, said sleeve being structured to move said safety interlock from the locked position to said unlocked position,
   wherein, when said safety interlock is disposed in said unlocked position, said adapter is structured to transfer movement of said actuator to said racking assembly to move said electrical apparatus with respect to said enclosure, and
   wherein said racking assembly further comprises a drive shaft; wherein the first portion of said adapter is structured to be coupled to said drive shaft; wherein the second portion of said adapter is movable with and independently with respect to the first portion; wherein, when the second portion moves independently with respect to the first portion, said adapter is structured not to move said drive shaft; and wherein, when the second portion moves with the first portion, said adapter is structured to move said drive shaft, thereby moving said electrical apparatus.

2. The coupling of claim 1 wherein said adapter further comprises a bearing member; and wherein said bearing member is disposed between the first portion of said adapter and the second portion of said adapter.

3. The coupling of claim 1 wherein said sleeve comprises a first segment and a second segment disposed opposite and distal from the first segment; wherein said adapter further comprises a first protrusion and a second protrusion; wherein said first protrusion extends outwardly from the first portion of said adapter and cooperates with the first segment of said sleeve; and wherein said second protrusion extends outwardly from the second portion of said adapter and cooperates with the second segment of said sleeve.

4. The coupling of claim 3 wherein said sleeve further comprises a first passageway and a second passageway; wherein said first protrusion is a first drive pin; wherein said second protrusion is a second drive pin; wherein said first drive pin is movably disposed in said first passageway; and wherein said second drive pin is movably disposed on said second passageway.

5. The coupling of claim 4 wherein the first segment of said sleeve includes a drive rib disposed within said first passageway; wherein said first drive pin cooperates with said drive rib; wherein said second passageway includes a first end and a second end; and wherein said second drive pin is structured to cooperate with a corresponding one of the first end and the second end.

6. The coupling of claim 5 wherein said sleeve further comprises a collar extending radially outwardly from said sleeve between the first segment and the second segment; wherein said second passageway extends away from said collar at an angle; wherein, when said actuator is actuated, the second portion of said adapter pivots thereby moving said second drive pin within said second passageway to move said sleeve with respect to said adapter; wherein said collar is structured to move said safety interlock toward said unlocked position; wherein, when said second drive pin engages a corresponding one of the first end of said second passageway and the second end of said second passageway, the second portion of said adapter pivots with the first portion and said collar maintains said safety interlock in said unlocked position; wherein, responsive to the first portion of said adapter pivoting, said first drive pin is structured to engage and move said drive rib, thereby transferring movement from said actuator into movement of said adapter to move said drive shaft.

7. A racking assembly for racking an electrical apparatus into and out of an enclosure, said racking assembly comprising:
   a safety interlock structured to move between a locked position corresponding to said racking assembly not being operable to move said electrical apparatus with respect to said enclosure, and an unlocked position corresponding to said racking assembly being operable to rack said electrical apparatus into or out of said enclosure;
   a drive shaft; and
   a coupling structured to couple said drive shaft to an actuator, said coupling comprising:
      an adapter comprising a first portion coupled to said drive shaft, and a second portion coupled to said actuator, and a sleeve movably disposed on said adapter, said sleeve moving said safety interlock from said locked position to said unlocked position, wherein, when said safety interlock is disposed in said unlocked position, said adapter transfers movement of said actuator to said drive shaft to move said electrical apparatus with respect to said enclosure, and wherein the second portion of said adapter is movable with and independently with respect to the first portion; wherein, when the second portion moves independently with respect to the first portion, said adapter does not to move said drive shaft; and wherein, when the second portion moves with the first portion, said adapter moves said drive shaft, thereby moving said electrical apparatus.

8. The racking assembly of claim 7 wherein said adapter further comprises a bearing member; and wherein said bearing member is disposed between the first portion of said adapter and the second portion of said adapter.

9. The racking assembly of claim 7 wherein said sleeve comprises a first segment and a second segment disposed opposite and distal from the first segment; wherein the first segment includes a first passageway; wherein the second segment includes a second passageway; wherein said adapter further comprises a first protrusion extending outwardly from the first portion and a second protrusion extending outwardly from the second portion; wherein said first protrusion is a first drive pin movably disposed in said first passageway; and wherein said second protrusion is a second drive pin movably disposed in said second passageway.

10. The racking assembly of claim 9 wherein the first segment of said sleeve includes a drive rib disposed within said first passageway; wherein said first drive pin cooperates with said drive rib; wherein said second passageway includes a first end and a second end; and wherein said second drive pin is cooperates with a corresponding one of the first end and the second end.

11. The racking assembly of claim 10 wherein said sleeve further comprises a collar extending radially outwardly from said sleeve between the first segment and the second segment; wherein said second passageway extends away from said collar at an angle; wherein, when said actuator is actuated, the second portion of said adapter pivots, thereby moving said second drive pin within said second passageway to move said sleeve with respect to said adapter; wherein said collar is structured to move said safety interlock toward said unlocked position; wherein, when said second drive pin engages a corresponding one of the first end of said second passageway and the second end of said second passageway, the second portion of said adapter pivots with the first portion and said collar maintains said safety interlock in said unlocked position; wherein, responsive to the first portion of said adapter pivoting, said first drive pin is structured to engage and move said drive rib, thereby transferring movement from said actuator into movement of said adapter to move said drive shaft.

12. The racking assembly of claim 11 wherein said safety interlock includes a slider and a number of protrusions; wherein said slider biases said safety interlock toward said locked position; wherein said collar of said sleeve cooperates with said number of protrusions to move said slider toward said unlocked position; and wherein, when said actuator is not actuated, said slider moves said safety interlock to said locked position.

13. An electrical apparatus structured to be racked into and out of an enclosure, said electrical apparatus comprising:
a housing;
an actuator; and
a racking assembly comprising:
a safety interlock being movable between a locked position corresponding to said racking assembly not being operable to move said electrical apparatus with respect to said enclosure, and an unlocked position corresponding to said racking assembly being operable to rack said electrical apparatus into or out of said enclosure,
a drive shaft, and
a coupling for coupling said drive shaft to an actuator, said coupling comprising:
an adapter comprising a first portion coupled to said drive shaft, and a second portion coupled to said actuator, and
a sleeve movably disposed on said adapter, said sleeve moving said safety interlock between said locked position and said unlocked position,
wherein, when said safety interlock is disposed in said unlocked position, said adapter transfers movement of said actuator to said drive shaft to move said electrical apparatus with respect to said enclosure, and
wherein said adapter further comprises a bearing member; wherein said bearing member is disposed between the first portion of said adapter and the second portion of said adapter; wherein the second portion of said adapter is movable with and independently with respect to the first portion; wherein, when the second portion moves independently with respect to the first portion, said adapter does not to move said drive shaft; and wherein, when the second portion moves with the first portion, said adapter moves said drive shaft, thereby moving said electrical apparatus.

14. The electrical apparatus of claim 13 wherein said sleeve comprises a first segment and a second segment disposed opposite and distal from the first segment; wherein the first segment includes a first passageway; wherein the second segment includes a second passageway; wherein said adapter further comprises a first protrusion extending outwardly from the first portion and a second protrusion extending outwardly from the second portion; wherein said first protrusion is a first drive pin movably disposed in said first passageway; and wherein said second protrusion is a second drive pin movably disposed in said second passageway.

15. The electrical apparatus of claim 14 wherein the first segment of said sleeve includes a drive rib disposed within said first passageway; wherein said second passageway includes a first end and a second end; wherein said sleeve further comprises a collar extending radially outwardly from said sleeve between the first segment and the second segment; wherein said second passageway extends away from said collar at an angle; wherein, when said actuator is actuated, the second portion of said adapter pivots, thereby moving said second drive pin within said second passageway to move said sleeve with respect to said adapter; wherein said collar moves said safety interlock toward said unlocked position; wherein, when said second drive pin engages a corresponding one of the first end of said second passageway and the second end of said second passageway, the second portion of said adapter pivots with the first portion and said collar maintains said safety interlock in said unlocked position; wherein, responsive to the first portion of said adapter pivoting, said first drive pin engages and moves said drive rib, thereby transferring movement from said actuator into movement of said adapter to move said drive shaft.

16. The electrical apparatus of claim 15 wherein said safety interlock includes a slider and a number of projections; wherein said slider biases said safety interlock toward said locked position; wherein said collar of said sleeve cooperates with said number of projections to move said slider toward said unlocked position; and wherein, when said actuator is not actuated, said slider moves said safety interlock to said locked position.

17. The electrical apparatus of 13 wherein said electrical apparatus is a circuit breaker; wherein said actuator is an electric motor; wherein said electric motor is substantially disposed within the housing of said circuit breaker; and wherein said coupling transfers movement of said electric motor to said coupling to unlock said safety interlock and move said drive shaft, thereby moving said circuit breaker into or out of said enclosure.

* * * * *